(12) United States Patent
Stopin et al.

(10) Patent No.: US 9,243,402 B2
(45) Date of Patent: Jan. 26, 2016

(54) CONSTRAINED-LAYER DAMPING MATERIAL

(75) Inventors: Gilles Stopin, Silly Tillard (FR); Celine Tesse, Saint Martin du Vieux Belleme (FR)

(73) Assignee: AUTONEUM MANAGEMENT AG, Winterthur (CH)

( * ) Notice: Subject to any disclaimer, the term of this patent is extended or adjusted under 35 U.S.C. 154(b) by 0 days.

(21) Appl. No.: 13/995,095

(22) PCT Filed: Dec. 15, 2011

(86) PCT No.: PCT/EP2011/072947
§ 371 (c)(1),
(2), (4) Date: Aug. 27, 2013

(87) PCT Pub. No.: WO2012/080416
PCT Pub. Date: Jun. 21, 2012

(65) Prior Publication Data
US 2013/0319791 A1     Dec. 5, 2013

(30) Foreign Application Priority Data

Dec. 16, 2011  (EP) .................................... 10195287

(51) Int. Cl.
| | |
|---|---|
| *B32B 11/04* | (2006.01) |
| *E04B 1/84* | (2006.01) |
| *C08L 95/00* | (2006.01) |
| *G10K 11/162* | (2006.01) |
| *G10K 11/168* | (2006.01) |
| *C08J 5/04* | (2006.01) |
| *C08K 3/26* | (2006.01) |
| *C09D 195/00* | (2006.01) |
| *C08K 13/04* | (2006.01) |
| *B32B 7/12* | (2006.01) |

(Continued)

(52) U.S. Cl.
CPC ................ *E04B 1/8409* (2013.01); *B32B 7/12* (2013.01); *B32B 11/02* (2013.01); *B32B 11/04* (2013.01); *C08J 5/045* (2013.01); *C08K 3/26* (2013.01); *C08K 13/04* (2013.01); *C08L 95/00* (2013.01); *C09D 195/00* (2013.01); *G10K 11/162* (2013.01); *G10K 11/168* (2013.01); *B32B 2260/00* (2013.01); *B32B 2307/102* (2013.01); *B32B 2605/08* (2013.01); *C08J 2395/00* (2013.01); *C08L 93/04* (2013.01); *C08L 2555/50* (2013.01); *C08L 2555/82* (2013.01)

(58) Field of Classification Search
CPC ....................................................... B32B 11/04
USPC ............................................................ 181/290
See application file for complete search history.

(56) References Cited

U.S. PATENT DOCUMENTS

| | | | |
|---|---|---|---|
| 3,243,374 A | 3/1966 | Gillard | |
| 4,288,490 A * | 9/1981 | Alfter et al. ................ | 428/314.8 |
| 4,734,323 A * | 3/1988 | Sato et al. .................. | 428/317.3 |

(Continued)

FOREIGN PATENT DOCUMENTS

| | | |
|---|---|---|
| EP | 1 955 899 | 8/2008 |
| WO | WO 86/06736 | 11/1986 |

(Continued)

*Primary Examiner* — Jeremy Luks
(74) *Attorney, Agent, or Firm* — Dentons US LLP

(57) ABSTRACT

A constrained-layer damping material including a bitumen material, a binder material, and a tackifier, wherein the bitumen is a soft grade with a penetration of at least 150 dmm and a ring and ball softening point of greater than about 35° C.

13 Claims, 2 Drawing Sheets

(51) Int. Cl.
  *B32B 11/02* (2006.01)
  *C08L 93/04* (2006.01)

(56) References Cited

U.S. PATENT DOCUMENTS

| | | | |
|---|---|---|---|
| 4,825,974 A * | 5/1989 | Hoffmann et al. | 181/290 |
| 6,110,985 A | 8/2000 | Wheeler | |
| 6,145,617 A * | 11/2000 | Alts | 181/290 |
| 6,508,875 B1 | 1/2003 | Bodt et al. | |
| 6,828,020 B2 | 12/2004 | Fisher et al. | |
| 7,147,716 B1 * | 12/2006 | Boukobza et al. | 156/286 |
| 2004/0168853 A1 * | 9/2004 | Gunasekera et al. | 181/290 |
| 2009/0277716 A1 * | 11/2009 | Eadara et al. | 181/290 |
| 2010/0013255 A1 * | 1/2010 | Mantovani et al. | 296/1.03 |
| 2011/0139542 A1 * | 6/2011 | Borroni | 181/290 |

FOREIGN PATENT DOCUMENTS

| | | |
|---|---|---|
| WO | WO 88/00221 | 1/1988 |
| WO | WO 2008/098395 | 10/2008 |

* cited by examiner

CONSTRAINED-LAYER DAMPING MATERIAL

CROSS REFERENCE TO RELATED APPLICATIONS

This application is a national phase application based on PCT/EP2011/072947, filed Dec. 15, 2011, which claims the priority of European Patent Application No. 10195287.7, filed Dec. 16, 2010, the content of both of which is incorporated herein by reference.

TECHNICAL FIELD

The present invention is directed to a vibration damping material for use in a constrained damping system and to a constrained layer damping product for damping noise in automotive applications.

BACKGROUND

Vibration damping materials are widely used in automotive applications to dampen the vibration and sounds of road noise and the engine. Viscoelastic materials are commonly preferred as damping materials. A damping effect, linked to the energy dissipated in the viscoelastic material, increases with an increase of the Young modulus and of the loss factor of the viscoelastic material. Additionally, the damping effect also increases in relation to the subjected deformation of the damping material. Traditional materials with a very high loss factor but a low Young modulus provide limited damping to a metal plate, and are not effective dampers. Other materials with a high Young modulus but a relatively low loss factor (like rubber), are also not very good as dampers. Good damping materials incorporate a compromise between Young modulus and loss factor.

In viscoelastic materials, the Young modulus decreases with temperature and the loss factor has a peak in function of temperature. Therefore, there is a temperature window where the damping effect on a metal plate (called the composite damping) has a peak. Dampers are designed to have this peak fitted to the application temperature.

There are two main principles of damping: the free layer damping (FLD) and the constrained layer damping (CLD).

In FLD, the main deformation in the viscoelastic material is from strain caused by bending of the metal sheet, normally the structural part that is prone to vibration due to sound waves. The amount of energy dissipated increases with the thickness of the damping material. Therefore, traditional damping materials tend to be rather thick. Additionally, traditional damping materials have a rather high Young modulus. In CLD, the main deformation in the viscoelastic material is from shear, since the damping material is sandwiched between two stiffer plates (a structural base layer and an aluminum constraining layer) that are displaced along their planes during vibration. A thin layer of viscoelastic material can be used for CLD, since the shear deformation is much larger than the tensile deformation of the FLD. The damping material is also typically softer than in FLD to ensure that there is a big difference between the stiffness of the metal sheets and the damping effect, thus ensuring a high shear force. The fact that the deformation is very large compensates for the low Young modulus. If the material is too stiff, then the strain deformation is too low. Of course the damping effect increases with increase of the damping factor of the viscoelastic material.

Stiffer structures, like car body panels, require constrained-layer damping. Constrained-layer damping consists of a constrained damping material (3) between a structural base layer (4) and a constraining layer (2) (FIG. 1). Both the structural base layer (4) and the constraining layer (2) are effectively working as constraining layers. For constrained layer damping, the method of attaching the layers does not matter as long as adequate surface contact and coupling occurs. However adhesives (5) if needed should have high shear stiffness, as softer adhesives will not adequately transfer shear strain to the middle-damping layer.

The constrained layer damping material (3) and a metal sheet as the constraining layer (2) are applied to selected parts or areas of the vehicle, which form the base structural layer (4) of the constrained damping system. These layers prevent vibrations and noise from being transmitted inside the vehicle to the passenger compartment. However, many of the surfaces to be treated with this type of damping system are not horizontal, but instead are in the vertical direction, sloping or even up-side down. Therefore, the adhesive (5) must work against gravity and should have little or no slow creep or flow characteristics with age.

Typically, materials for the constrained layer dampening material (3) comprise of thermoplastic or rubber materials, which are capable of suppressing vibrations and sounds. Bitumen based damping material is cheaper than rubber based material but has the disadvantage that it is not auto adhesive.

Bitumen materials are normally characterized by a combination of penetration, softening point and viscosity, and can be divided in the following classes of material: penetration grade bitumen, oxidized bitumen, and hard grade bitumen.

Penetration grade bitumen is obtained from fractional distillation of crude oil. The lightest fraction are vapours i.e. butane and propane, while the heavier fractions are taken off the column for gasoline production. The heavier fractions include kerosene, then gas oil, and high molecular weight hydrocarbons as the heaviest fraction. These heavy hydrocarbons, which are called long residue, are further distilled in a vacuum distillation column to produce gas oil, distillates, and short residue. The short residue is the feed stock for producing over 20 grades of bitumen. These are classified by their penetration index, typically PEN values of 10 to 330 dmm, which is the distance in tenth millimeters that a needle penetrates the bitumen under a standard test method. Penetration grade bitumen are characterized by penetration and softening point.

Oxidized bitumen are characterized by softening point and penetration, eg 85/40 is oxidized bitumen with a softening point of 85 and a penetration of 40. Oxidized bitumen is obtained by further processing the short residues. They are semi blown or fully blown with air to increase their molecular weight.

Hard grade bitumen are characterized by their softening point and penetration, but are only designated by the softening point range, e.g. H80/90.

Experience has shown that, in sound deadening panels in vehicles, penetration or PEN grades typically provide better damping characteristics than oxidized grades. However it is common belief that 15-pen is to brittle, whereas 50-pen and higher pen grades are too soft, producing panels that flow during storage. The bitumen is positioned on the vehicle body panels to be dampened and subjected to heat (around 140° C.), whereupon they conform to the shape of the body panel under their own weight and adhere strongly. Typical composition is (% of mass):

Bitumen (25 pen) 25-30%
Polymer (e.g. APP, EVA etc) 0-5%
Fibre 3-5%

Filler (e.g. Jimestone, clay, mica etc) 60-70%. Morgan et al., Shell Bitumen Industrial Handbook, Thomas Telford, 1995.

A common method of applying vibration damping material (3) is to provide it in the form of a sheet or tape, which includes an adhesive layer (5). The adhesive layer (5) adheres the damping material (3) to the desired substrate, such as an automobile body panel or interior panel. However this requires the vibration damping material (3) be laminated to at least one pressure sensitive adhesive layer, or heat activated adhesive layers.

It is well known that the optimal time for installing these damping sheets is prior to curing the exterior surface paint of the vehicle, which typically occurs in a bake oven that can reach temperatures in excess of 190° C. As such, the ability of the adhering material of the sheet must be able to withstand such intense temporary temperatures. It has been found that thermoplastic resin based adhesives do not provide adequate adhesive strength after the heat bake process due to loss of mechanical properties as temperatures increase.

As such it is well known that heat activated adhesives, such as thermosetting adhesives, are preferred wherein the adhesive's activation point can be appropriately modified, for example, based upon the temperature of the heat bake process. Such adhesives thus have the ability of withstanding the temperatures typically found in the heat bake process, while maintaining the requisite adhesive strength. However, the damping material laminate must be temporarily attached to the metallic medium, such as the automobile body panel or interior panel, in the interim until the adhesive is properly activated.

U.S. Pat. No. 3,243,374 discloses the use of a ferrite powder within a bitumen-based noise and vibration-damping sheet to allow preliminary positioning of the sheet during assembly together with a heat activated adhesive. At application and before the adhesive is heat activated, the sheet is held on in place magnetically.

An alternative to thermosetting adhesives is the use of an auto adhesive damping material. Currently, there are two main materials on the market, one material composite based on bitumen and one based on rubber.

Constrained layer damping material can be made of a combination of bitumen and a tackifier, for example hydrocarbon resin to obtain an auto adhesive damping material. Normally two grades of bitumen, a 20/30 pen grade bitumen, which has a penetration between 20-30 dmm and a ring & ball softening around 55° C., and a blown bitumen, with a penetration between 35-40 dmm and a ring & ball softening around 100° C., produce the damping material. During manufacturing, the two different bitumen materials are stored in separate tanks and mixed together during the preparation of the damping material, in order to increase the melting temperature of the final material. However, the blown bitumen is a niche product for big oil companies, and therefore it is increasingly difficult to obtain the blown bitumen material to make the dampers. Bitumen with hydrocarbon resin, can be used without the need for curing as the resin is already mixed in the bitumen. However, hydrocarbon resin is no longer allowed inside the passenger area of the car due to its high level of VOC (Volatile organic compounds).

U.S. Pat. No. 6,828,020 discloses an example of a butyl rubber type of damping material. Butyl rubber constrained layer material was developed for the building industry and is now commonly used in the damping of automotive body panels. However, the production and raw materials for butyl rubber are expensive. In particular, the mixing of the ingredients requires a high shear stress mixer and is therefore an energy consuming process. Currently, butyl rubber material developed for the building industry is also used for vehicle applications, but not all auto adhesive butyl rubber material is able to withstand the required curing temperatures. For example, the aluminum foil of the constraining layer (2) tends to delaminate or start sliding from the damping material (3) during the curing process. The butyl damping material currently on the market for automotive applications have partly been modified in order to support a curing temperature of 190° C.

These self-adhesive or auto-adhesive damping materials are produced in sheet form with an aluminum foil as a constraining layer on one side and a release paper on the opposite side of the sheet. After removing the release paper, the adhesive material of the damping material is directly applied to the panel to be dampened, without the need of additional adhesive layers.

SUMMARY OF INVENTION

The present disclosure is directed to a constrained-layer damping (CLD) material having a bitumen material, a binder material, and a tackifier, wherein the bitumen is a soft grade bitumen with a penetration of at least 150 dmm and a ring & ball softening point of greater than about 35° C. The CLD is comparable in acoustic properties with the materials currently on the market, and may use readily available raw materials. The damping material-may be self-adhesive and therefore may not require additional adhesive layers.

DETAILED DESCRIPTION

Figure 1:
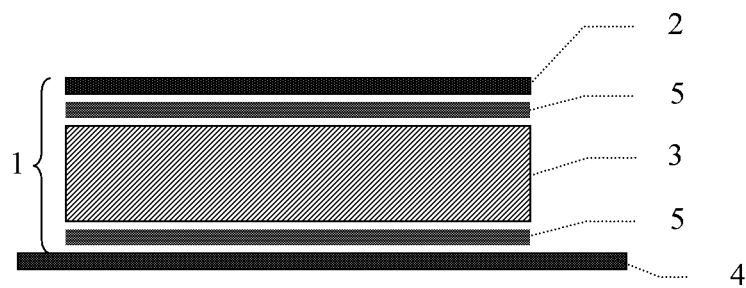
FIG. 1 is a schematic representation of a constrained-layer damping (CLD) material.

Surprisingly, it was found that a soft bitumen with a penetration of at least 150 dmm and a ring & ball softening point greater than about 35° C. can be used as a constrained layer damper. The CLD material may comprise at least a bitumen material and a binder material, wherein the bitumen material is a soft grade bitumen with a penetration of at least 150 dmm and a ring & ball softening point of greater than about 35° C. In one embodiment, the bitumen material is a 160/220 pen grade bitumen, since this bitumen is commonly used for roads and therefore is readily available on the market in great quantities. Other bitumen materials having comparable physical properties may be used as well. The bitumen may include from 20% to 40% of the total weight of the damping material. The binder may include from 45% to 70% of the total weight of the damping material. Suitable binder materials may include, for example, chalk, powdered limestone, mica, rubber or latex type of materials, or fibrous materials, like polyester fibres, cellulose fibres or wood fibres, or mixtures thereof. In one embodiment, the binder includes a mixture of chalk and a cohesive binder, for example, fibres and/or latex. The cohesive binder of at least one of fibres, a polymer, latex or synthetic rubber comprises between 1.5 and 6% of the total weight of the damping material.

The damping material may be used with one or more adhesive layers or a tackifier may be added to the damping material. Suitable tackifiers may include, for example, magnetic particle fillers or a resin. The resin may include resin selected from the group consisting of rosin, ester gum, tall oil, esters of rosin, hydrogenated rosin, esters of hydrogenated rosin, reaction products from rosin and maleic anhydride, and reaction products from rosin and phenol. The esters of rosin may be formed from the reaction of rosin with alcohol, wherein the alcohol is selected from the group consisting of methyl alcohol, dipropylene glycol, glycerine, and pentaerythritol, or mixtures thereof. Surprisingly, it was found that by combining a 160/220 pen grade bitumen with a small amount of rosin or colophon, the bitumen kept the softness necessary for a constrained layer, is auto adhesive, and stable over time and over a temperature range normal for the use of these type of products in cars. The behavior of the material may be comparable with that of optimized butyl rubber based damping material, and may replace this more expensive material in the same applications. In one embodiment, the rosin may comprise up to 8% of the total weight of the damping material, preferably between 0% and 6%. A damping material with between 2% and 8% weight of a resin, may form a self-adhesive damping material.

The rosin derivate may include at least one of methyl ester of rosin or the methyl ester of hydrogenated rosin, or the triethylene glycol ester of rosin or the triethylene ester of hydrogenated rosin. Advantageously, a rosin derivate that is a viscous liquid at the processing temperature may be used. The hydrogenated versions of rosin may be used, as they have higher viscosity. In some embodiments, the dampening material may include 0% of resin when an alternative adhesive system is used, for example, magnetic particles or adhesive glue layers. It is further contemplated that additional additives may be added, for instance mixing or processing aids like Calcium Oxide.

Constraining layer (2) may include a stiff layer, for example a metal layer including aluminum or steel. Other materials including Glass mats, fleece materials or carton can also be used for a specific application. The thickness of the layer may be between 0.05 mm and 0.2 mm. In some embodiments, a CDL may include the combination of damping material (3), an underbody panel as constraining layer (2), and the vehicle bottom plate as structural base layer (4). See, e.g., WO 2008/098395.

The damping material of the present disclosure may be used as a constrained layer in a CLD. A release paper (not shown) may be used on the opposite site of the constraining layer, to prevent sticking during storage and transport, until the product is applied to the structural part to be dampened. The material according to the invention may be used on horizontal and vertical parts of a vehicle. Due to the material combination of the present disclosure, the bitumen damping material is stable over the temperature range for application. Furthermore the damping properties of the damping material are above 0.1 and in the frequency range of interest. Although there is no need for a temperature-curing step, the damping material may be applied to the vehicle body before the curing of the paint without any remarkable effect on the adhesion or the damping properties of the material, in particularly it does not diminish these properties. However it can also be applied later on in the assembling process of the car.

Measurement Methods

The adhesive properties were measured using the FINAT test method FMT2 for peel adhesion (90°) at 100 mm/minute. This test is used to compare the adhesive response of different laminates. Measuring peel adhesion at 90° normally gives a lower value than at 180° and allows values to be measured for materials normally giving paper tear. Peel adhesion is the force required to remove pressure sensitive coated material applied to a standard test plate, from the plate at a specified angle and speed. Adhesion was measured 24 hours after application being considered the ultimate adhesion. Test strips used were 25 mm wide and had a length of 190 mm in the machine direction. The machine was set at 100 mm per minute jaw separation rate. The peel adhesion (90°) given is the average result for the strips tested in Newton's per 25 mm width. The test was repeated at different test temperatures.

For the measurement of the damping loss properties of the reference samples and the material according to the invention, the ISO 6721-3 was used. The samples were measured on the Carrousel equipment commercially available from Rieter Automotive systems.

Comparative Examples

Reference 1 includes a state of the art butyl damping material 1255 AL15 as sold by the company Olin. This is an alu-butyl adhesive tape sold with release paper. According to the product description, this material is a viscoelastic butyl with a damping performance over a temperature range of between −30 to 80° C., however it should be applied to the basic structural part between 5 and 40° C. It has a total area weight of 2.9 kg/m2, a total thickness of 1.7 mm and a density of between 1.4 and 1.7. The aluminum has a thickness of 150 pm.

Reference 2 was made using 20/30 hard grade bitumen. The material was made with around 27% Bitumen 20/30, Chalk around 57% and cohesive binders, fibres, CaO and latex up to around 6%. In the stickiness test, damping materials that were not self-adhesive with an additional adhesive glue layer (5) as indicated in FIG. 1. Either one or two adhesive glue layers were used. As a glue layer, a commercial available acrylic adhesive of the company Adesia was used.

Damping Material According to the Invention

The example damper material according to disclosed embodiments (INV) was made with:
  Bitumen 160/220 pen grade around between 30% and 35% by weight
  Binder: CaCO3 between 55 and 60% by weight together with cellulose fibres around 2% by weight and synthetic latex around between 2.4 and 2.6% by weight
  Rosin was used as indicated; if nothing is indicated around 4% by total weight was used.

As bitumen a 160/220 road bitumen from Unipetrol was used with a penetration of 160 to 220 mm and a Ring and Ball Softening point of between 35 and 43° C. This material has a breaking point of −15° C. and a softening point of 12° C.

As resin the methyl ester of rosin was used, for instance Granolite.

The specific weight percentage was optimized for each sample to obtain a stable product. Where necessary, additional additives were added for processing reasons like handling, drying of the bitumen, etc. These additives are known in the art and do not have a direct influence on the damping performance of the material.

For the measurement of the CLD properties both bitumen materials were baked on to prevent glue layers from interfering with the data obtained. The constrained construction was in both cases realized with 0.2 mm aluminum foil. The butyl damper was measured without baking. The adhesion being an intrinsic property of this material.

FIG. 1 shows a basic constrained-layer damping (CLD) consisting of constrained damping material (3) between a structural base layer (4) and a constraining layer (2). For constrained layer damping, the method of attaching the layers does not matter as long as adequate surface contact and coupling occurs. No additional adhesive layers may be used when damping material (3) contains magnetic particles or is autoadhesive. However optional adhesive layers (5), for example a glue layer, may be used and may have high shear stiffness, as softer adhesives will not adequately transfer shear strain to damping material (3). The constraining layer (2), the constrained layer damping material (3), and if used, the adhesive layers (5) together form the constrained layer damping product that may be sold to the car industry, for instance. If adhesive layers (5) are used, the outer surface of adhesive layer (5), that will be attached to the structural base layer, ergo the vehicle body part, may include a release paper to prevent the material from unwanted sticking during transport. Auto-adhesive constraining layers, like for instance the reference 1 material may not require additional adhesive layers (5).

Figure 2:
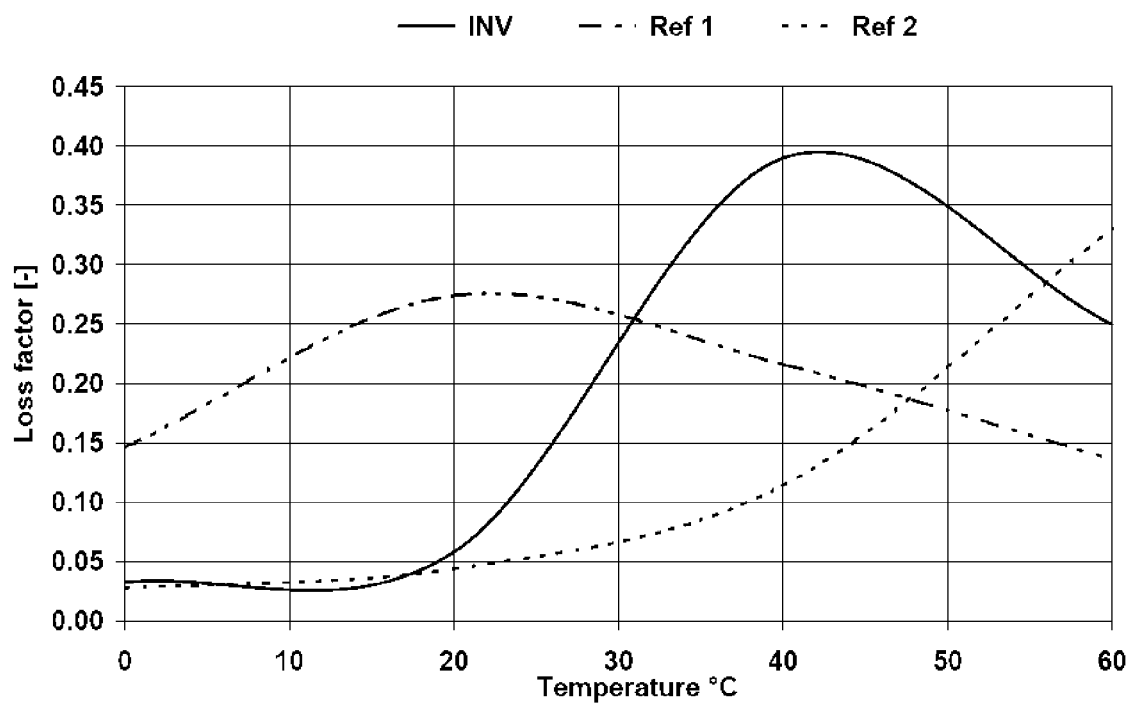
FIG. 2 is a graph illustrating the loss factor of the damping material of FIG. 1.

FIG. 2 shows the loss factor measured for constrained layer damping systems with either one of the reference materials (Ref $1_5$ Olin; and Ref 2 20/30 Bitumen) or the material according to disclosed embodiments (INV) as the constrained layer material in this case with 0% rosin.

The new constrained layer material according to disclosed embodiments (INV) shows overall a better performance than the reference materials. As a vehicle is normally heated up in most areas to around 30° C. during driving, the peak of the loss factor in the range of 30-50° C. is optimal for this type of application. As shown in FIG. 2, the constrained layer of disclosed embodiments (INV) has a peak loss factor in the range of 30-50° C.

Figure 3:
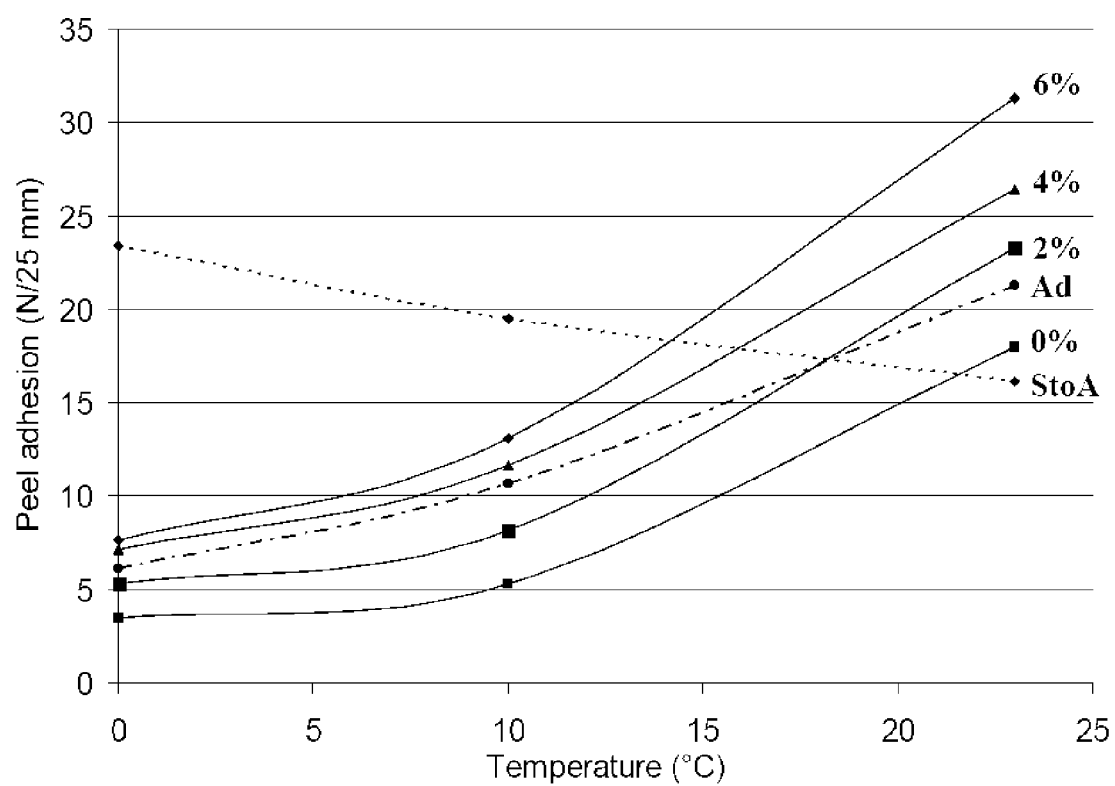
FIG. 3 is a graph illustrating the stickiness of the damping material of FIG. 1.

The peel adhesion of samples of the bitumen damper according to disclosed embodiments with 0 to 8% Rosin were compared with the adhesion of a state of the art adhesive layer (Ad) and reference 1, the state of the art butyl damping material (StoA). FIG. 3 shows the results of the measurement after 24 hours at the given temperature.

As shown in FIG. 3, at 23° C. the bitumen damping material with 0% rosin according to disclosed embodiments shows greater self-adhesiveness in comparison to the butyl reference (StoA). Additionally, at lower temperatures the damping material with 0% rosin is lower than both the state of the art adhesive layer (Ad) and state of the art butyl damping material (StoA). The adhesiveness of the adhesive layer (Ad) is accepted in the industry for use over the whole temperature range in a vehicle, and therefore a rosin weight percentage of at least around 4% would be comparable with the adhesiveness of adhesive material currently on the market. However the actual adhesiveness and therefore the weight of rosin needed is dependent on the specific requirements of the place in the vehicle and the specification of the vehicle producer. In a horizontal position, the adhesiveness of the 0% damping material is enough to keep a placed damper in position. The butyl damping (StoA) material shows an adhesive failure in FIG. 3, and the damping material tends to delaminate from the aluminum constraining layer or from the structural car part. This is a less favorable failure as a cohesive failure where the break occurs inside the damping material, as is the case for the damping material according to the invention. It is therefore more easy to adjust the needed adhesiveness dependent on the product specific requirements.

A constrained damping material comprising bitumen 160/220 pen grade is contrary to the conventional thinking of those skilled in the art, and is an alternative to the more expensive special bitumen mixtures currently used. By using a rosin or colophon resin it is possible to create a constrained layer material that not only behaves better than the currently used materials but also is auto adhesive. As rosin does not affect the VOC values, the alternative damper material of the present disclosure may be used inside the passenger compartment without health risks.

The invention claimed is:

1. A constrained-layer damping material comprising:
   a 160/220 pen grade bitumen material;
   a tackifier; and
   a binder material;
   wherein the bitumen material is about 20% to 40% of the total weight of the damping material.

2. The damping material according to claim 1, wherein the binder material comprises at least one of chalk, powdered limestone, mica, synthetic latex and fibers.

3. The damping material according to claim 1, wherein the binder is between about 45% and about 70% of the total weight of the damping material.

4. The damping material according to claim 3, wherein the binder comprises a cohesive binder, the cohesive binder comprises at least one of fibres, polymer, latex, and synthetic rubber, and wherein the cohesive binder is between about 1.5% and about 6% of the total weight of the damping material.

5. The damping material according to claim 1, wherein the tackifier is selected from the group consisting of magnetic particle fillers and a resin.

6. The damping material according to claim 1, wherein the tackifier is a rosin derivative.

7. The damping material according to claim 6, wherein the rosin derivative includes up to about 8% of the total weight of the damping material.

8. The damping material according to claim 6, wherein the rosin derivate is selected from the group consisting of methyl ester of rosin, methyl ester of hydrogenated rosin, triethylene glycol ester of rosin, and triethylene ester of hydrogenated rosin.

9. The damping material according to claim 1, wherein the damping material exhibits a peak loss factor in the range of 30° C. to 50° C.

10. A constrained layer damping product, for use in a constrained layer damping system, the constrained layer damping product comprising: a constraining layer; and
   a constrained layer,
   wherein the constrained layer includes a constrained-layer damping material which comprises a 160/220 pen grade bitumen material, a binder material, and a tackifier, wherein the bitumen material is about 20% to 40% of the total weight of the damping material.

11. The constrained layer damping product according to claim 10, further including at least one additional adhesive layer.

12. The constrained layer damping product according to claim 10, wherein the tackifier is a rosin derivative, and the weight percentage of the rosin derivate is between about 4% and about 8% of the total weight of the damping material.

13. The constrained layer damping product according to claim 10, wherein the damping materials exhibits a peak loss factor in the range of 30° C. to 50° C.

* * * * *